United States Patent Office 2,898,391
Patented Aug. 4, 1959

2,898,391

NATURAL RUBBER COMPOSITION CONTAINING A PYROGENICALLY FORMED MIXTURE OF SILICA AND ANOTHER METAL OXIDE AND PROCESS OF PREPARATION

Ernst Wagner, Rheinfelden, Baden, and Hermann Westlinning, Stotzheim, Post Hermulheim, near Koln (Rhine), Germany, assignors to Deutsche Gold- und Silber-Scheideanstalt vormals Roessler, Frankfurt am Main, Germany, a corporation of Germany No Drawing. Application December 10, 1954
Serial No. 474,608

Claims priority, application Germany December 15, 1953

3 Claims. (Cl. 260—762)

This invention relates to elastomeric compounds and more particularly to novel compositions of elastomers containing mixtures of metal oxides as the reinforcing filler. As used in this specification the term "metal oxide" includes silicon dioxide.

It is known that certain finely-divided pyrogenically-produced metal oxides especially silica, alumina and titania, formed in a flame by the hydrolysis or oxidation of the corresponding metal halide at elevated temperatures, are excellent reinforcing agents for elastomeric materials, notably natural. In rubber compounds, for example, these oxides function almost as effectively as carbon black, and, in fact are increasingly being used in substitution for carbon black in products for which light colors are preferred, as in white side wall tires.

It has been found, however, that when any of these oxides is used alone difficulties are encountered in making the compounds. When silica only is used it makes the compound extremely stiff and hard as well as scorchy and excessive amounts of sulfur and accelerator must be used. Also excessive power is consumed by the mixer in working the compound. When alumina or titania are used alone their respective high bulk weights increase the weight of the compound to an objectionable extent, hence cannot be included in sufficient quantity to achieve the desired amount of reinforcement.

Surprisingly we have found that an improved product results when to the selected elastomeric compound is added a mixture of silica and aluminia and/or titania, all of which being the products of hydrolysis or oxidation of the corresponding metal halides as described above and which are composed of particles no larger than about 50 millimicrons. When mixtures in the range of proportions of 100 parts by weight silica to about 5–40 parts by weight alumina or titania or a mixture thereof, are mixed with the elastomer and the other ingredients of the compound by conventional techniques no abnormal difficulties are encountered. In other words, such a compound can be made with about as much ease as compounds with other fillers are made and without the excessive stiffening and hardening effect encountered when using silica alone. The finished compound is thus sufficiently soft to ensure ease of workability otherwise obtained only with less active fillers. A concomitant advantage of this invention consists in that smaller amounts of sulfur and accelerator are required for adequate cure of rubber compounds made according to the invention than when silica alone is used.

The metal oxide pigments contemplated by this invention must be very finely divided, i.e., in the particle size range below about 50 millimicrons. Suitable processes for their production are described, for example, in co-pending U.S. patent applications, Ser. No. 129,089, filed January 23, 1949, of Stokes and Kistiakowsky, and Ser. No. 455,369, filed September 10, 1954, of Wagner. While some improvement in the product may be obtained by incorporating mixtures of two or more different metal oxides separately produced, a surprisingly great improvement is effected by using diverse metal oxides coproduced in a single reaction as, for example, by a process such as that described in the above-identified Wagner application. These improvements and the great differences therebetween are demonstrated in the following examples.

Example 1

A rubber compound containing 40 parts by weight of pyrogenously prodced silicon dioxide to 100 parts by weight of rubber has a "Defo" hardness of 1800, and is hence not readily workable. If a compound is used that, instead of 40 parts by weight of silicon dioxide, contains no more than 32 parts by weight of silicon dioxide and 8 parts titanium dioxide, then the finished rubber compound has a "Defo" hardness of 1450. In a similar compound containing 36 parts silicon dioxide and 4 parts aluminum oxide to 100 parts rubber, the "Defo" hardness was 1300. The commercial specifications of the three compounds differ only insignificantly from each other.

Example 2

In a rubber compound containing 40 parts of filler to 100 parts of rubber, in one instance a silicon dioxide obtained by thermal decomposition in the gaseous phase is incorporated, and in another instance a mixed oxide of 90% silicon dioxide and 10% aluminum oxide obtained by simultaneous reaction of the original substances in the gaseous phase by the process of the Wagner application identified above, compounds of entirely different properties are obtained:

| | $SiO_2$ | Mixed oxide |
|---|---|---|
| "Defo" hardness | 1,800 | 675 |
| Ultimate strength, kg./sq. cm | 314 | 313 |
| Modulus, 300 kg./sq. cm | 70 | 65 |
| Ultimate elongation, percent | 670 | 685 |
| Elasticity, percent | 50 | 62 |
| Shore hardness | 65 | 56 |
| Notch strength, kg./cm | 37 | 35 |

In order to attain as low a "Defo" hardness with the same amount of filler, it would be necessary for 40% of the silicon dioxide to be replaced by aluminum oxide in a mechanical mixture of silicon dioxide and aluminum oxide, in which case other properties of the rubber compound would deteriorate.

The property of Defo hardness is determined by compressing a 10 x 10 mm. cylinder of uncured rubber to 4 mm. in 30 seconds. The hardness value is the weight required to achieve such compression.

It will be seen from the examples that the incorporation of mixed oxides as filler into rubber stock achieves exceptional results which were completely unexpected and for which we can suggest no explanation.

Having thus described our invention, we claim:

1. A new composition comprising a vulcanizable natural rubber compound containing as reinforcing filler a mixture of silica and another metal oxide selected from the group consisting of alumina, titania, and mixtures thereof the proportion of other metal oxide to silica being in the range 1:20 to 8:20 parts by weight, said mixture of metal oxides being the product of hydrolysis of a mixture of the corresponding metal halides at elevated temperatures and consisting of particles no larger than about 50 millimicrons in equivalent spherical diameter.

2. A vulcanizable natural rubber compound containing as reinforcing filler a mixture of pyrogenically co-formed metal oxides of average particle size no greater than 50 millimicrons, consisting of silica and another metal oxide selected from the group consisting of alumina, titania and mixtures thereof in the proportion of 1 to 8 parts by weight other metal oxide to each 20 parts of silica.

3. A process which comprises incorporating into a vulcanizable natural rubber compound a substantially non-coloring reinforcing homogeneous mixed pigment consisting of silica and another metal oxide selected from the group consisting of alumina, titania and mixtures thereof, pyrogenically coformed from a mixture of their corresponding volatile halides and having an average particle size no greater than 50 millimicrons, the proportion of other metal oxide to silica in the mixture being from 1 to 8 parts other oxide to each 20 parts of silica by weight, and vulcanizing the resultant compound to a resilient vulcanizate.

References Cited in the file of this patent

UNITED STATES PATENTS 2,427,942    Bulifant _____ Sept. 23, 1947
2,681,327    Brown _____ June 15, 1954

OTHER REFERENCES

Wolf: Rubber Age, June 1954, pages 389–395.
Wolf et al.: Rubber Age, June 1950, pages 317–322.